United States Patent

May

[15] 3,671,719

[45] June 20, 1972

[54] ROLLER STRUCTURE FOR CARD READER

[72] Inventor: Gordon Herbert May, San Jose, Calif.

[73] Assignee: International Business Machines Corporation, Armonk, N.Y.

[22] Filed: April 19, 1971

[21] Appl. No.: 135,000

[52] U.S. Cl. ....................235/61.11 D, 271/36, 235/61.11 R

[51] Int. Cl. ....................................B65h 5/06, G06k 17/00

[58] Field of Search ................198/134; 40/344; 74/216.3, 74/461; 226/190, 193, 180; 271/36, 80, 3, 4; 235/61.11 A–61.11 E

[56] References Cited

UNITED STATES PATENTS

| | | | |
|---|---|---|---|
| 685,370 | 10/1901 | Bridgewater | 271/36 |
| 1,051,726 | 1/1913 | Gammeter | 271/36 |
| 2,901,246 | 8/1959 | Wagner | 271/3 |
| 3,218,060 | 11/1965 | Harbison | 271/4 |
| 3,441,188 | 4/1969 | May et al. | 226/180 |

*Primary Examiner*—Thomas A. Robinson
*Attorney*—Thomas A. Briody and Hanifin and Jancin

[57] ABSTRACT

A magnetic card reader has one or more specially structured resilient rollers of generally cup-shaped configuration, which engage successive cards to align them with a guiding surface and propel them past a transducer head. The rollers have a series of wedge-shaped cuts formed in their annular periphery to produce a plurality of radially projecting and individually flexible teeth. When these teeth engage the card after it has reached the transducer head by movement in a first direction, they perform the dual purposes of: 1) reducing the prospects of rupture and severe wear, while repetitively driving the cards, 2) positively driving the trailing edge of each card from one side to the other of its path preparatory to initiation of the return movement of the card in a second direction opposite to said first direction, and 3) providing positive registration for the card in both directions.

9 Claims, 6 Drawing Figures

Patented June 20, 1972 3,671,719

2 Sheets-Sheet 1

*INVENTOR*

GORDON H. MAY

BY Thomas A. Briody

ATTORNEY

Patented June 20, 1972 3,671,719

2 Sheets-Sheet 2

ROLLER STRUCTURE FOR CARD READER

BACKGROUND

1. Field of the Invention

This invention relates to a roller drive for cards, and more particularly to a magnetic card reading device which incorporates one or more roller drives specially structured to function in an improved fashion.

2. Description of the Prior Art

In magnetic card readers of the type commonly used today, the card is inserted through an entry mouth of the device. From there, the card is propelled through a processing passageway by one or more driving rollers. The driving rollers frictionally engage the card to drive it in a first direction past a reading head which extracts data from magnetically recorded information on the card. After the information is read from the card, it is reversed by spring action and the card is driven in a second direction back to the vicinity of the entry mouth for removal from the reader.

The roller structure used for the aforementioned card readers has been popularly constructed into a cup-like configuration from resilient material, with the annular periphery of the roller frictionally engaging the card to drive it through the processing passageway. The roller may also be rotatably positioned in the reader with respect to the card so that in addition to driving the card through the passageway, the roller also aligns the card into registration with a predetermined reference surface. When used in this type of an application, it has been found that the resilient lip of the cup-shaped driving roller tends to rupture and/or wear out after prolonged use, in view of continuous frictional engagement with the surfaces of the cards being processed. The present invention purports to overcome this problem, while at the same time ameliorating the functional contribution which the roller makes to the card reader.

SUMMARY OF THE INVENTION

An important object of this invention is to provide a highly reliable card processing device which includes an improved roller driving mechanism.

Another object of this invention is to obtain an improved roller mechanism which has enchanced durability in the face of prolonged use.

A further object of my invention is to provide an improved magnetic card reader which includes one or more resilient rollers structured to provide a novel and efficient type of cyclic coaction with a driven card.

Still another object of the present invention is to produce an improved magnetic card reader which includes a resilient cup-shaped roller structured to drive a card in opposite directions, to help register the card in both directions, and also to coact with the trailing edge of the card to help move it laterally from one side to the other of a processing passageway.

In carrying out my invention, in one form thereof, I have provided a self-reversing reader for a magnetic striped rectangular card. This reader includes a longitudinal passageway having an entry aperture at one of its ends for receiving a card. The passageway is located alongside of and parallel to a guiding surface. A transducer is placed in communication with the passageway for reading information from a magnetically striped card passing therethrough. To drive the magnetic card through the passageway after it has been inserted into the entry aperture, a pair of resilient cup-shaped rollers are provided. Each of these rollers is driven about an axis of rotation that is disposed transversely to the direction of movement of the card and in parallel relationship to a card engaged by the roller. In accordance with the present invention, the roller is constructed with a series of wedge-shaped cuts formed in its annular periphery. These wedge-shaped cuts produce a plurality of individually deflectable fingers that extend outwardly from the axis of rotation of the roller and angularly toward the guiding surface. With such an arrangement, when a magnetic card is inserted into the entry aperture for processing, the rotating fingers of a first one of the rollers frictionally engage an adjacent surface of the card to progressively move it in a first direction through the passageway and away from the entry aperture. The fingers also positively maintain the card in registration. After the card has been driven away from the first roller in the first direction, it is engaged and driven by a second roller to continue its movement in a first direction, with positive maintenance of registration, until it reaches a reversing spring. When this condition occurs, the resilient fingers of the second roller coact with the trailing edge of the magnetic card to operate it laterally from one side to the other of the passageway, in a second direction perpendicular to the first direction and to the axis of rotation of the roller. As a result, the second roller helps implement the reverse movement of the card. The card is then driven by the aforementioned rollers in a third direction opposite the first direction, with continuous positive registration, until it reaches an exit aperture, whereby it may be removed from the reader.

BRIEF DESCRIPTION OF THE DRAWINGS

The foregoing objects, features and advantages of this invention will be apparent from the following description of the drawings, in which.

DETAILED DESCRIPTION

Figure 1:
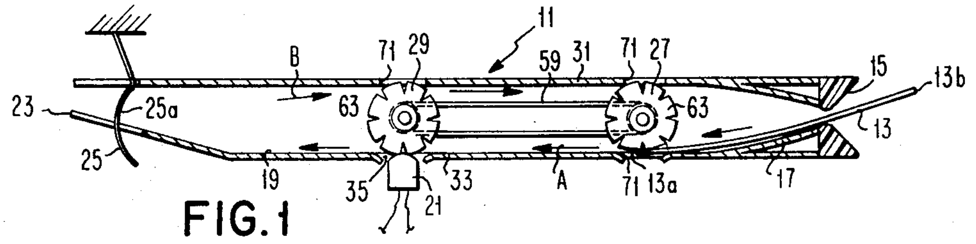
FIG. 1 is a side elevation view, partially in section and partially broken away, of a self-reversing card reader embodying one form of my invention.

Referring now to the drawings, and initially to FIG. 1 thereof, there is shown a card reading device 11 for reading magnetic cards 13 such as credit cards. The device 11 essentially involves an entry aperture 15 located at one end 17 of an elongated passageway 19, a transducer 21 located near another end 23 of the passageway 19, a reversing spring 25 for changing the direction of a processed card within the passageway 19, and a pair of cup-shaped rollers 27, 29.

The passageway 19 is constructed so that it is sufficiently wide to accommodate the width or side-to-side dimension of a standard credit card (e.g. 2 ⅛ inches) or paper stock data processing cards, and sufficiently deep to accommodate the rollers 27, 29, and a card sandwiched between the resiliently compressible outer periphery of the rollers and the respective upper and lower surfaces 31, 33 of the passageway 19.

For reading information magnetically recorded on a striped section of the card 13, transducer 21 is supported in device 11 so that it communicates with passageway 19 through reading aperture 35. The transducer 21 is a magnetic reproducing head suitably connected to a control circuit or a CPU which performs some function dependent upon the information stored on the card, such as by way of example, verifying that the credit of a magnetic credit card owner is in good standing.

For reversing the card after it has been moved from end 17 to end 23 of the passageway 19, the leaf spring 25 is supported in cantilever fashion so that bow-shaped portion **25*a* of the spring 25 is forced to the left from its FIG. 1 position, when the card is driven into engagement with it. As portion 25*a*** of the spring 25 is deflected to the left, it has a restoring force built up into it which acts upon the forward edge 13*a* of the card 13 to reverse the direction of the card after its trailing edge 13*b* has been driven far enough to the left (viewing FIG. 1).

Figure 2:
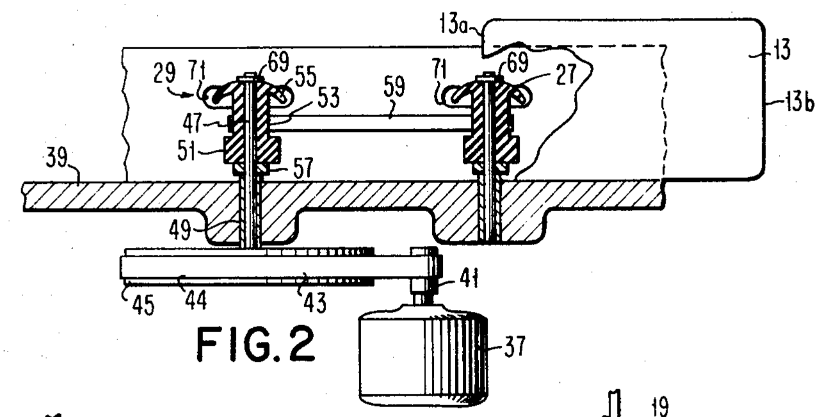
FIG. 2 is a bottom view, partially in section and partially broken away, showing further aspects of the card reader of FIG. 1.
Figure 3:
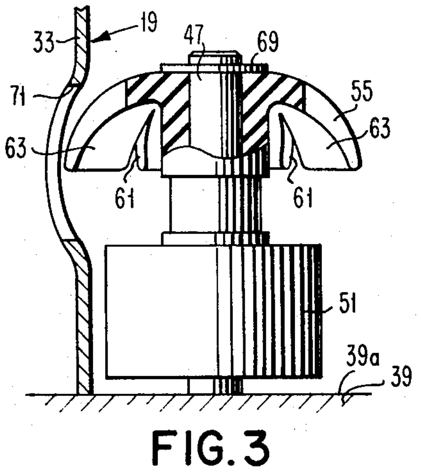
FIG. 3 is an enlarged fragmentary view showing the cup-shaped roller, the registration surface and an adjacent wall of the passageway, when there is no card present.
Figure 4:
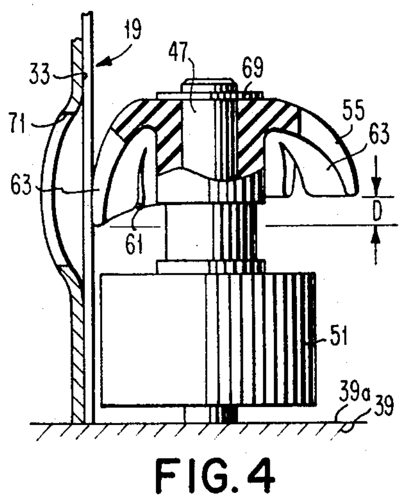
FIG. 4 is an enlarged fragmentary view showing the same essential elements as FIG. 3, but with a card present therein for coaction with the roller.

Turning now to an important aspect of this invention, which concerns the structure of the rollers 27, 29 and their performance in the card reader 11, attention is directed to FIGS. 2, 3 and 4. Motor 37 is suitably supported on base plate 39, with its output wheel 41 connected by a flexible belt 43 to the peripheral groove 44 of flywheel 45. Flywheel 45 is secured to shaft 47 which is rotatably journalled in a bearing 49 of base plate 39. Shaft 47 extends through base plate 39 from one side to the other thereof. On the side of base plate 39 opposite flywheel 45, there is secured to shaft 47 the resilient roller 29. Roller 29 is identical in structure to roller 27, and it includes a capstan 51 of cylindrical configuration, a cylindrical neck 53 of lesser diameter than capstan 51, and cup 55 having an outer diameter larger than the capstan 51. The capstan 51 is located on shaft 47 adjacent to bearing 49 of the base plate, being separated therefrom by a conventional thrust bearing 57. The neck 53 of roller 29 receives a flexible belt 59, which is in concurrent frictional engagement with the necks 53 of both rollers 27, 29, thereby enabling motor 37 to drive both of the roller units.

Figure 5:
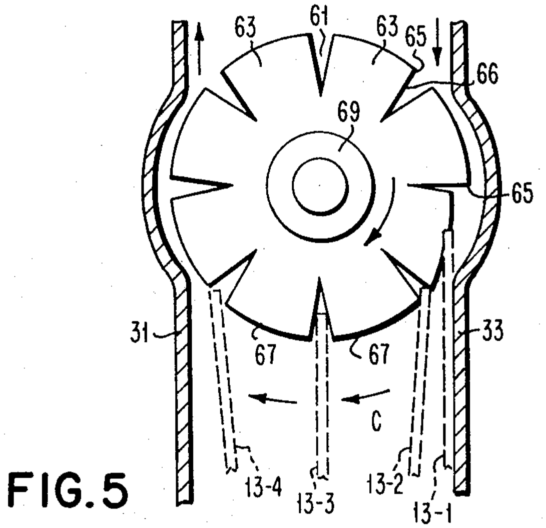
FIG. 5 is an enlarged fragmentary sectional view showing how one of the resilient rollers cams the trailing edge of a card from one side to the other of the reader passageway.

The cup portion 55 of each roller 27, 29 has a generally curved and conical shape (FIG. 3), with a series of wedge-shaped cuts 61 (FIG. 5) formed therein. The wedge-shaped cuts 61 are spaced about the periphery of the cup 55 and located therein to provide a series of individually flexible fingers or teeth 63. As best shown in FIG. 5, each of the fingers 63 includes a driving edge or shoulder 65 which engages a card to drive it in a predetermined direction, and a suitably curved or radiused peripheral surface 67 to help minimize wear of the fingers in response to continuous use in the reader. Between each driving edge 65 and the apex of the cut 61 which edge 65 faces upon, there is an inclined surface 66. The purpose of the inclined surfaces will be set forth hereinafter.

The overall roller 29 is retained on shaft 47 by means of a flanged shoulder 69 or some other suitable fastener secured to the shaft 47 at its outermost end.

Roller 27 is mounted on a shaft 47 in the same manner as roller 29, but is located closer to the entry aperture 15 of the reader 11.

In operation, when the card 13 is inserted into reader 11, its leading transverse edge 13a is engaged by driving edges 65 and surfaces 66 of fingers 63 of roller 27, which rotate in a clockwise direction (viewing FIG. 1) to enhance the force of gravity and positively drive the front of the card downwardly against lower surface 33 of passageway 19. The card 13 is thereupon driven by the resilient fingers 63 so that it moves in direction A, from the right end to the left end of the passageway (viewing FIG. 1).

Without a card being present in the reader 11, as shown in FIG. 3, there is a suitable recess or slot 71 located in each surface of passageway 19 adjacent fingers 63 of the roller 27. The roller 29 has slot 35 for transducer access in one side of the passageway, and a slot 71 on the other and opposite surface of the passageway. The slot 71 alleviates any possible friction or wear upon the resilient fingers 63 when there is no card 13 present in the device.

As shown in FIG. 4, when the card 13 is being driven by fingers 63 of the rollers 27, 29, the fingers are deflected radially inwardly toward the axis of rotation of the rollers to create a first dynamic driving force in a direction parallel to the longitudinal axis of the passageway 19 (i.e. direction A of FIG. 1). The deflection of fingers 63 toward the base plate 39 by an illustrated distance "D" (viewing FIG. 4) creates a secondary dynamic force which tends to move the longitudinal edge of card 13 adjacent to base plate 39, into registration with surface 39*a* of base plate 39. This secondary force is in a direction perpendicular to the first dynamic card driving force and thus provides positive alignment of the card in the device 11.

When the leading edge 13a of the card 13 reaches roller 29, (FIG. 1) the fingers 63 thereof then resiliently engage the adjacent flat surface of card 13, so that driving edges 65 push the card past aperture 35 and transducer 21. As the card 13 moves past the transducer 21, prerecorded information contained on the card is thereupon read out by the magnetic head, with the resilient restoring forces of the roller fingers urging the card laterally into engagement with the head. It will be understood by those skilled in the art that the transducer 21 may also write or encode information on the magnetic stripe of the card.

As the card 13 passes the transducer 21, leading transverse edge 13*a* of the card 13 approaches the concave or bowed face 25*a* of reversing spring 25. On or about the moment in time when edge 13*a* of the card initially engages spring 25, the trailing transverse edge 13*b* of the card is progressively engaged by driving edges 65 and the adjacent inclined surfaces 66 of fingers 63. Edges 65 and surfaces 66 of the fingers 63 thereupon operate the trailing edge 13*b* of the card 13 in direction C of FIG. 5 (and card sequence 13-1 to 13-4) from surface 33 to opposite surface 31 of the passageway, while at the same time loading the frontal edge 13a of the card against spring 25. As a result when the trailing edge 13*b* of the card nears surface 31, the spring 25 impels the card in the opposite direction B (viewing FIG. 1). The driving edges 65 then act upon the opposite surface of card 13 to commence driving it back in direction B toward entry aperture 15. The driving operation of the roller fingers 29, 27 in direction B, to return the card 13 to entry aperture 15, is similar to that already described for movement of card in direction A. Card 13 may thus be driven out of the system through entry aperture 15.

It will now, therefore, be seen that by means of the novel construction of rollers 27, 29, they each perform several resilient functions in expeditious fashion. Each roller tends to have a relatively long functional life span because the fingers are individually deflectable. In addition, the fingers of the roller have been effectively utilized in conjunction with transverse surfaces of the card to positively drive the card laterally or transversely from one surface to the other of the passageway. In the first illustrated embodiment of my invention, the resilient fingers of the roller also effectively align the card into side registration during its movement toward and away from the transducer.

Figure 6:
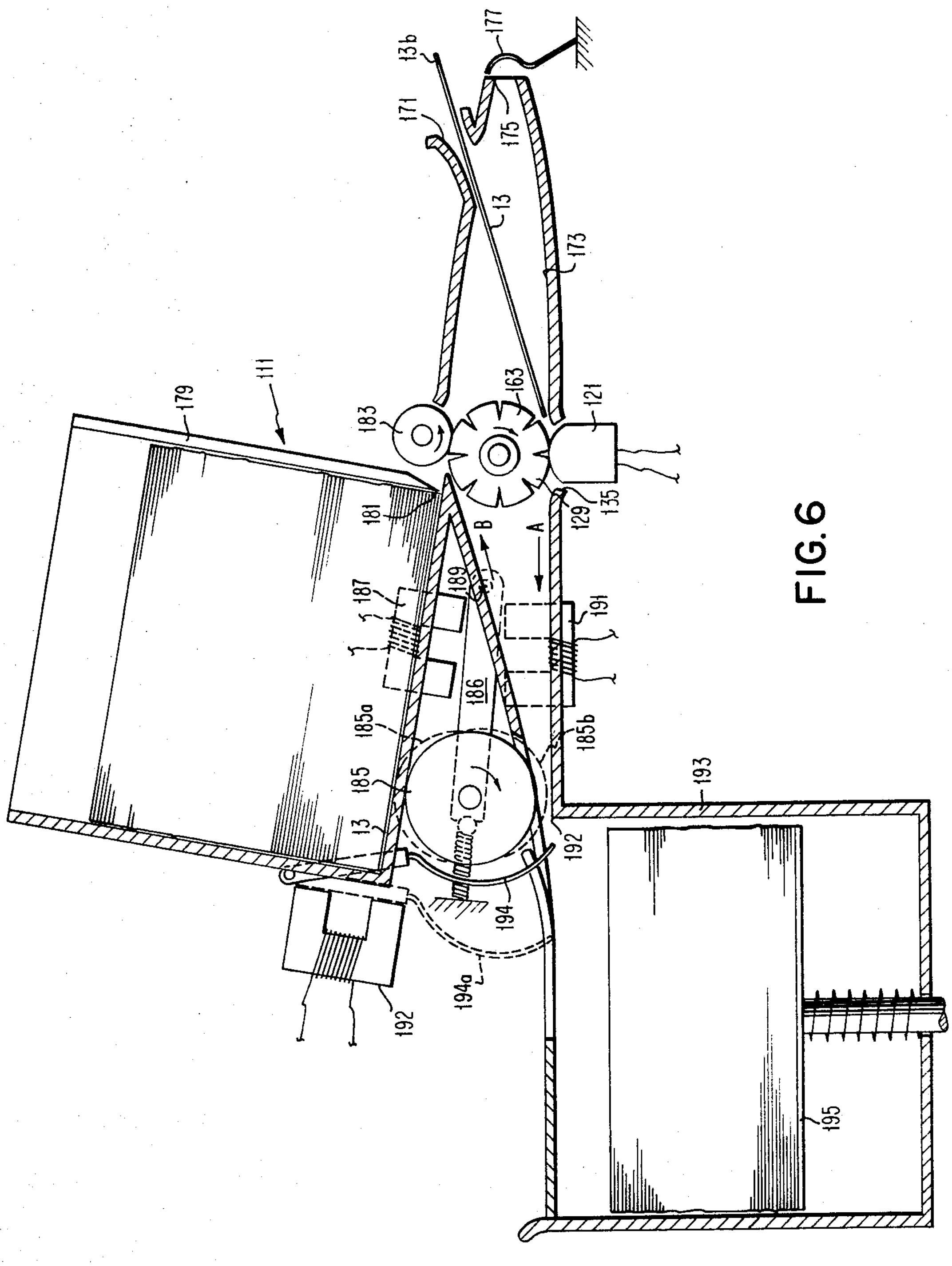
FIG. 6 is a side elevation view of an alternative form of a card reader embodying my invention, with an entrance hopper for storing a multiplicity of cards prior to their entry into the device.

An alternative form of the present invention is shown in FIG. 6. Here the card reader 111 differs from reader 11 in that the former includes an automatic card feeding source and disposal, and uses only a single cup-shaped roller 129 for driving and reversing the cards after their insertion into the processing passageway. The transducer aperture 135 and transducer 121 are located directly opposite roller 129, near to the entry sources of the cards. Thus, more particularly, the card reader 111, on the right side thereof, viewing FIG. 6, includes a manual entry mouth 171 through which card 13 may be manually inserted into passageway 173, and an exit aperture 175 which allows a card 13 to reach a first reversing spring 177, as will be further described hereinafter.

To the left of roller 129, viewing FIG. 6, and on the upper side of passageway 173, there is located a card hopper 179. Hopper 179 is preferably of rectangular cross section, being structured to stack a series of 500 standard sized magnetic cards (e.g. credit cards or paper stock data processing cards), and at its bottom adjacent roller 129 there is an exit slit 181 which allows the lowermost card 13 stacked in the hopper 179 to be gravity fed into passageway 173 between roller 129 and an adjacent idler 183 when a pivoted driving wheel 185 is operated into dotted position 185*a* by actuation of a hopper magnet 187. As shown by FIG. 6, the driving wheel 185 is supported by a bell-crank arm 186 so that hopper magnet 187 may be energized to pull wheel 185 upwardly in a clockwise direction of rotation about pivot 189. When wheel 185 is in position 185*a*, it rotates in a clockwise direction to drive the lowermost stacked card downwardly and to the right. When the forward edge of a card 13 leaving hopper 179, reaches the upper periphery of roller 129, it is thereupon driven by roller 129 between fingers 163 thereof and idler 183, until the forward edge of the card 13 moves outwardly through exit aperture 175 to engage reversing spring 177. In similar manner to spring 25 and roller 29 of card reader 11, the trailing edge of the card 13 received from the hopper is then moved downwardly by the fingers 163 of roller 129 so that the direction of the card is reversed. The card 13 is then driven underneath the roller 129 and past head 121 for readout.

As the card 13 moves in direction A past head 121, if it is desired to place the card into storage, a stacker magnet 191 disposed opposite hopper magnet 187 is thereupon energized. At this time, a hold magnet 192 attracts a second reversing spring 194 so that spring 194 is located in position 194a where it is free and clear of any cards moving through passageway 173. Stacker magnet 191 pulls the driving wheel 185 downwardly in a counterclockwise direction of rotation about pivot 189, and the wheel 185, being then disposed in position 185*b*, turns in a clockwise direction of rotation to drive the processed card into slit 192 of stacker 193. The stacker 193 has cross-sectional configuration and dimensions approximately the same as hopper 179, so that it can neatly store 500 processed cards. As is well known in the art, to enable stacked cards 13 to be readily removed from stacker 193, there is a spring biased platform 195 located therein which serves as a spring biased support for the lowermost card, and continually urges the uppermost card toward the top of the stacker compartment, adjacent entry slit 192.

If it is desired to reread the card 13 after its initial reading by head 121, the driving wheel 185 may be returned to its neutral position (shown by full lines of FIG. 6), and the reversing spring 194 may be released by its operating magnet 192 so that it returns to its normal position (shown in full in FIG. 6). The leading edge of card 13 then impinges upon reversing spring 194 and the fingers 163 of roller 129 thereupon drive the trailing edge of card 13 upwardly in passageway 173 so that it moves generally in direction B, between roller 129 and idler 183 until card 13 passes the upper periphery of roller 129 and is again reversed by spring 177.

For manual processing of a card 13 in card reader 111, the card is entered by hand through mouth 171 and its forward edge 13*a* then moves between the lower periphery of roller 129 and head 121, in the same manner as already described for cards entering from hopper 179.

It will be seen that the new roller structure and card reader set forth herein provides an improved technique for processing cards, which readily lends itself to mass production manufacture. Such a structure is also extremely efficient in operation and provides long life at very economical cost.

While in accordance with the Patent Statutes, I have described what at present are considered to be the preferred embodiments of this invention, it will be obvious to those skilled in the art that various changes or modifications may be made therein without departing from the present invention.

What I claim is:

1. A self-reversing reader for information contained on a card, said reader comprising a passageway for guiding the movement of the card in first and second opposite directions at associated first and second operative levels of said passageway;

a transducer communicating with said passageway for cooperation with said card passing through the passageway in one of said directions;

means for reversing the direction of movement of said card from said first direction to said second direction;

means for driving said card in each of said directions;

said driving means including at least one resilient roller engageable with said card during coaction of said card with said reversing means;

said resilient roller having a series of individually deflectable and radially extensive fingers formed thereon which coact with a card thereby to drive said card in the first and second directions, said resilient roller also having a series of slits, one of which is located between each pair of adjacent fingers, said slits being structured to coact with a trailing edge of said card to cam said card from one operative level to another operative level of said passageway thereby to assist in reversing said card within said passageway.

2. The reader of claim 1 wherein the slits are wedge-shaped and they coact progressively with the trailing edge of each card to positively drive said card from one operative level to another operative level of said passageway.

3. The reader of claim 1 wherein said fingers extend radially outwardly from the axis of rotation of said roller and angularly toward a reference guiding surface forming part of said passageway, so that during movement of the card in the first and second directions it is biased into registration with said guiding surface.

4. The reader of claim 2 wherein the slits between the resilient fingers are dimensioned to limit the degree of flexion of said fingers as the fingers drive the card, thereby to enhance the longevity of said rollers.

5. A self-reversing reader for information contained on a card having a magnetic strip on one side thereof, said reader comprising a passageway having an entrance for receiving said card;

said passageway being located on one side of a guiding surface forming part of said passageway;

a head communicating with said passageway for cooperation with the magnetic stripe of a card passing therethrough;

means for driving said card from said entrance through said passageway and past said head in a first direction parallel to said guiding surface, thereby to allow registration of the head with the magnetic stripe of said card;

means for reversing the direction of movement of said card so that after said card passes said head during movement in said first direction, said driving means will drive said card in a second direction opposite to said first direction;

said driving means including at least one roller engageable with said card during coaction of said card with said reversing means, said roller having a series of individually deflectable fingers formed thereon, said fingers extending radially outwardly from the axis of rotation of said roller and angularly toward said guiding surface, thereby to act upon said card during movement of said card in said first and second directions to bias said card into registration with said guiding surface, said fingers being cooperably located with respect to said card so that they act independently and resiliently upon said card during movement of said card in the first direction and second direction to drive said card in one or the other of said directions dependent upon the location of said card with respect to said roller.

6. The self-reversing reader of claim 5 wherein said roller includes a series of peripherally located wedge-shaped slits disposed between said fingers, said slits structurally configured to coact with a trailing edge of said card to cam said card from one operative level to another and opposite operative level of said passageway thereby to assist in reversing said card within said passageway.

7. The self-reversing reader of claim 6 wherein the head is capable of reading information from or writing information on, said magnetic stripe.

8. The self-reversing reader of claim 7 wherein at least two of said rollers are used to propel cards in said first and second directions within said passageway, one of said rollers being located near the entrance end of said passageway, and the other of said rollers being located adjacent said head, and substantially spaced from the entrance end of said passageway.

9. A self-reversing card handling device for processing information contained on a card having a magnetic stripe on one side thereof, said device comprising a passageway for guiding the movement of the card in first and second opposite directions at associated first and second operative levels of said passageway;

a transducer communicating with said passageway for cooperation with the magnetic stripe of a card passing through the passageway in one of said directions;
means for reversing the direction of movement of said card from said first direction to said second direction;
means for driving said card in each of said directions;
said driving means including at least one resilient roller engageable with said card during coaction of said card with said reversing means;
said resilient roller having a series of individually deflectable and radially extensive fingers formed thereon which coact with a card thereby to drive said card in the first and second directions,
said resilient roller also having a series of slits, one of which is located between each pair of adjacent fingers,
said slits being structured to coact with a trailing edge of said card to cam said card from one operative level to another operative level of said passageway thereby to assist in reversing said card within said passageway.

* * * * *